US006647451B1

(12) United States Patent
Barmore

(10) Patent No.: US 6,647,451 B1
(45) Date of Patent: Nov. 11, 2003

(54) BASIC INPUT/OUTPUT INTEGRATION OF MOTHERBOARD EXTENSION FEATURES AND PLUG AND PLAY INFORMATION DELIVERY

(75) Inventor: Brad A. Barmore, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 09/608,192

(22) Filed: Jun. 30, 2000

(51) Int. Cl.[7] ............................................. G06F 13/00
(52) U.S. Cl. ......................... 710/301; 710/63; 709/301
(58) Field of Search .................................. 710/300, 301, 710/305, 315, 63; 439/59, 61, 65; 361/803, 785, 788, 796, 683, 724, 748, 725; 709/301, 253; 379/908; 375/222

(56) References Cited

U.S. PATENT DOCUMENTS 5,765,008 A * 6/1998 Desai et al.
5,835,346 A * 11/1998 Albani et al.
5,963,431 A * 10/1999 Stancil

OTHER PUBLICATIONS

How PCI Works by Jeff Tyson.*

* cited by examiner

Primary Examiner—Gopal C. Ray
(74) Attorney, Agent, or Firm—Blakely, Sokoloff, Taylor & Zafman LLP

(57) ABSTRACT

A riser card with an interface on a motherboard can reduce the overall cost of an electronic system as well as simplify upgrading the features provided by the riser. Implementation costs can be reduced for components that may otherwise require shielding in order to prevent electromagnetic interference if the component were located on the motherboard. Other components can also be simplified if located on a riser rather than the motherboard. The riser card described herein provides functionality so that an operating system controlling the riser card can load the appropriate driver software thereby simplifying operation of the electronic system. In one embodiment, a BIOS stored in a memory on the motherboard interacts with a memory on the riser card to obtain information related to functionality of the riser card and to properly initialize the components of the riser card.

30 Claims, 13 Drawing Sheets

BASIC INPUT/OUTPUT INTEGRATION OF MOTHERBOARD EXTENSION FEATURES AND PLUG AND PLAY INFORMATION DELIVERY

FIELD OF THE INVENTION

The invention relates to electronic devices, for example, computer systems. More particularly, the invention relates to configuration of computer systems based on specific hardware devices available to the computer system.

BACKGROUND OF THE INVENTION

Current computer systems and other electronic systems are designed and manufactured with specific hardware components (e.g., audio hardware, modem hardware, video hardware). The hardware components indicate to an operating system running on the computer system what software drivers are necessary for proper functionality. For example, audio hardware can include a register that is known to the operating system. During startup of the computer system, a basic input/output system (BIOS) retrieves information from the audio hardware and stores the information in a predetermined location. The operating system checks the predetermined location and loads the corresponding software driver.

Because new software drivers are often required for new hardware, for example, because of added functionality, it is important to match the appropriate driver with the appropriate hardware. Also, for reasons of backward compatibility, many drivers may be provided by an operating system, only a few of which are actually used by the hardware of the computer system. For at least these reasons, designers and manufacturers of computer systems must design the computer systems so that hardware components communicate the functionality available to the operating system. Because of the many hardware components and software drivers, proper design of a computer system can be difficult and time consuming.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for motherboard and riser card Plug-and-Play (PnP) functionality support are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A riser card is an extension of the motherboard to which it is attached. Logically, the riser card is a portion of the motherboard. Physically, the riser card is attached to the motherboard through a connector or other type of interface, and can be more easily removed and replaced than typical motherboard-mounted components. Thus, like motherboard-mounted components, the functionality of the riser card is typically determined during boot up of the system.

A riser card with a corresponding interface on a motherboard can reduce the overall cost of an electronic system as well as simplify upgrading the features provided by the electronic system. Implementation costs can be reduced, for example, for sensitive analog components that may otherwise require shielding in order to prevent electromagnetic interference if the same analog components were located on the motherboard. Other components can also be simplified if located on a riser rather than the motherboard. Upgrading of features supported by the electronic system is simplified because the riser card can be installed or replaced to enhance the existing features of the electronic system. The riser card described herein provides plug and play functionality so that an operating system controlling the electronic system in which the riser card is included can load the appropriate driver software thereby simplifying operation of the electronic system.

Figure 1:
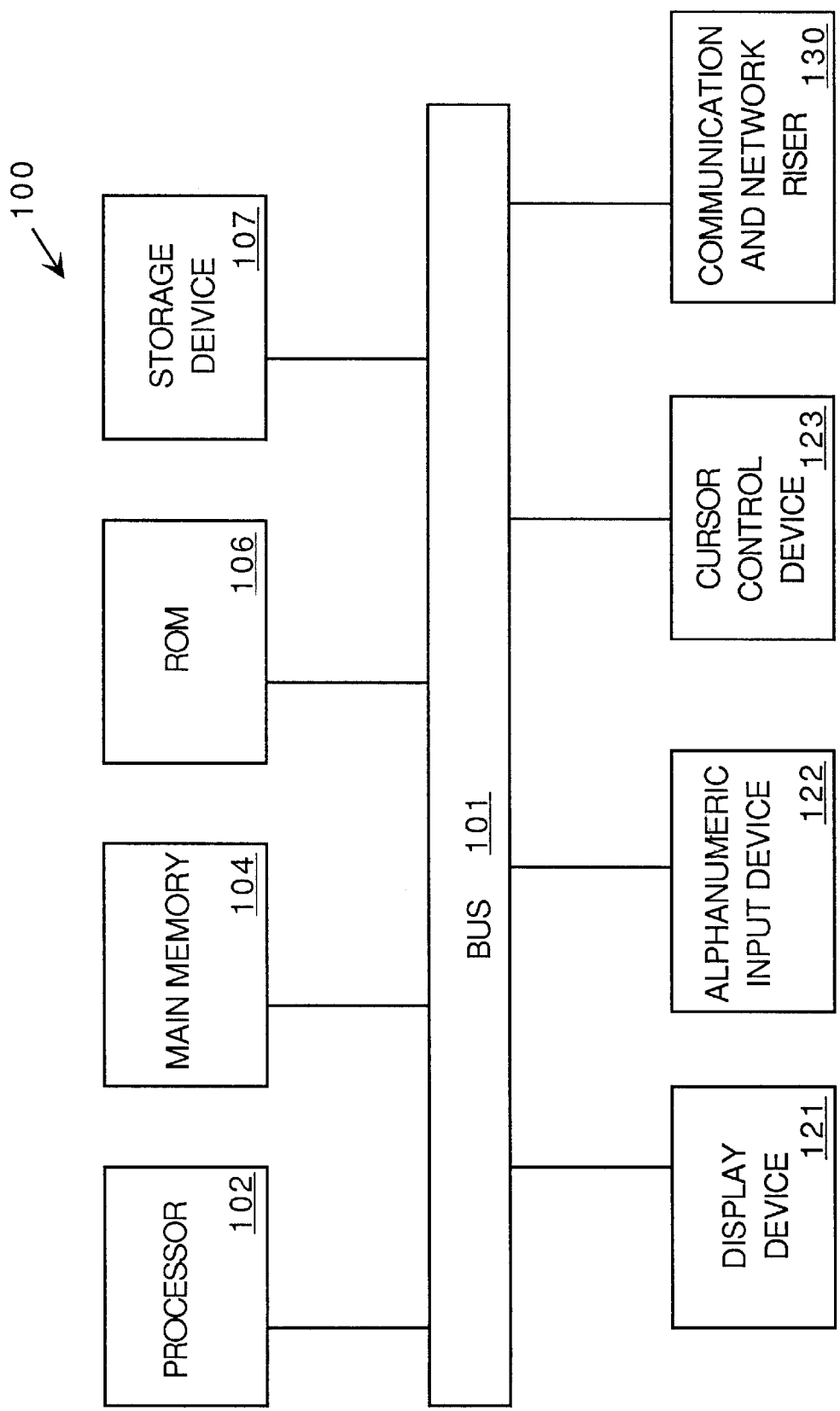
FIG. 1 is a block diagram of one embodiment of an electronic system.

FIG. 1 is a block diagram of one embodiment of an electronic system. The system illustrated in FIG. 1 is intended to represent a range of electronic systems including, but not limited to, computer systems, set top boxes and thin clients. Alternative systems can include more, fewer and/or different components.

System 100 includes bus 101 or other communication device to communicate information, and processor 102 coupled to bus 101 to process information. While system 100 is illustrated with a single processor, system 100 can include multiple processors and/or co-processors. System 100 further includes random access memory (RAM) or other dynamic storage device 104 (referred to as main memory), coupled to bus 101 to store information and instructions to be executed by processor 102. Main memory 104 also can be used to store temporary variables or other intermediate information during execution of instructions by processor 102.

System 100 also includes read only memory (ROM) and/or other static storage device 106 coupled to bus 101 to store static information and instructions for processor 102. Data storage device 107 is coupled to bus 101 to store information and instructions. Data storage device 107 such as a magnetic disk or optical disc and corresponding drive can be coupled to system 100.

System 100 can also be coupled via bus 101 to display device 121, such as a cathode ray tube (CRT) or liquid crystal display (LCD), to display information to a computer user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121.

System 100 further includes Communication and Network Riser (CNR) 130 to provide access to a network, such as a local area network, as well as provide communications functionality, such as audio input/output, Local Area Network (LAN) or a modem connection. As described herein, CNR 130 is used as an exemplary riser card. Other types of riser cards providing other types of functionality can be similarly supported. In one embodiment, CNR 130 physically separates noise sensitive systems from the noisy environment of the motherboard. Placing the communications and networking components on CNR 130 also simplifies motherboard design and provides easier upgrade of communications and networking components.

As described in greater detail below, CNR 130 provides PnP functionality. In one embodiment, CNR 130 includes an electrically erasable programmable read-only memory (EEPROM) or other memory device (not shown in FIG. 1) that provides sufficient information related to the functionality of CNR 130 that a basic input/output system (BIOS), operating system, or other service can load the appropriate drivers to support the functionality of CNR 130. In one embodiment, the BIOS, operating system, or other service is represented as a sequence of instructions in a machine-readable medium.

As used herein, a machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals), etc.

Figure 2:
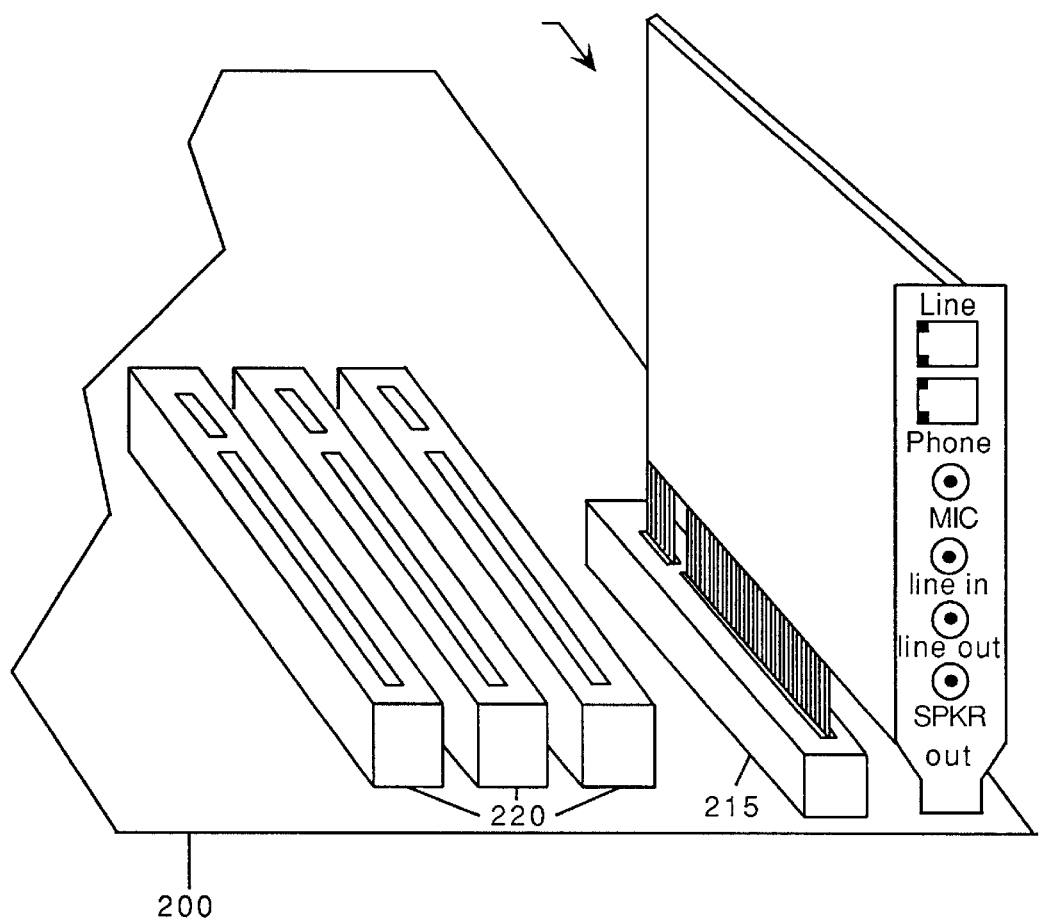
FIG. 2 illustrates one embodiment of a Communications and Networking Riser (CNR) and associated slot.

FIG. 2 illustrates one embodiment of a Communications and Networking Riser and slot. In one embodiment, motherboard 200 includes multiple expansion slots 220 as well as CNR slot 215 to receive CNR card 130. In one embodiment, expansion slots 220 are Peripheral Component Interconnect (PCI) expansion slots. In alternate embodiments, other types of expansion slots can be provided. Use of such industry standard expansion slots is well known in the art. In alternate embodiments other types of risers or motherboard extensions can be provided.

In general, a riser card is a logical extension of the motherboard. In other words, the riser card operates as if it were a part of, or coupled to, the motherboard. In contrast, expansion card, such as PCI expansion cards, operate independent of the motherboard.

In one embodiment, slot 215 is also coupled to motherboard 200. In FIG. 2, slot 215 is illustrated as a female connector; however, slot 215 can be implemented as a male connector. CNR 130 is configured to connect to slot 215. CNR 130 includes hardware components for use with the components of motherboard 200. For example, CNR 130 can include modem hardware, audio codec hardware, network interface hardware, etc. One or more of the hardware components of CNR 130 has a corresponding software driver that is executed by a processor on motherboard 200.

Identification and loading of the proper software drivers is described in greater detail below. In one embodiment, CNR 130 supports multi-channel audio, V.90 analog modem, phone-line based networking and/or 10/100 Ethernet based networking. In alternate embodiments, CNR 130 supports additional and/or different services (e.g., wireless networking, video, other modem protocols, etc.).

Figure 3:
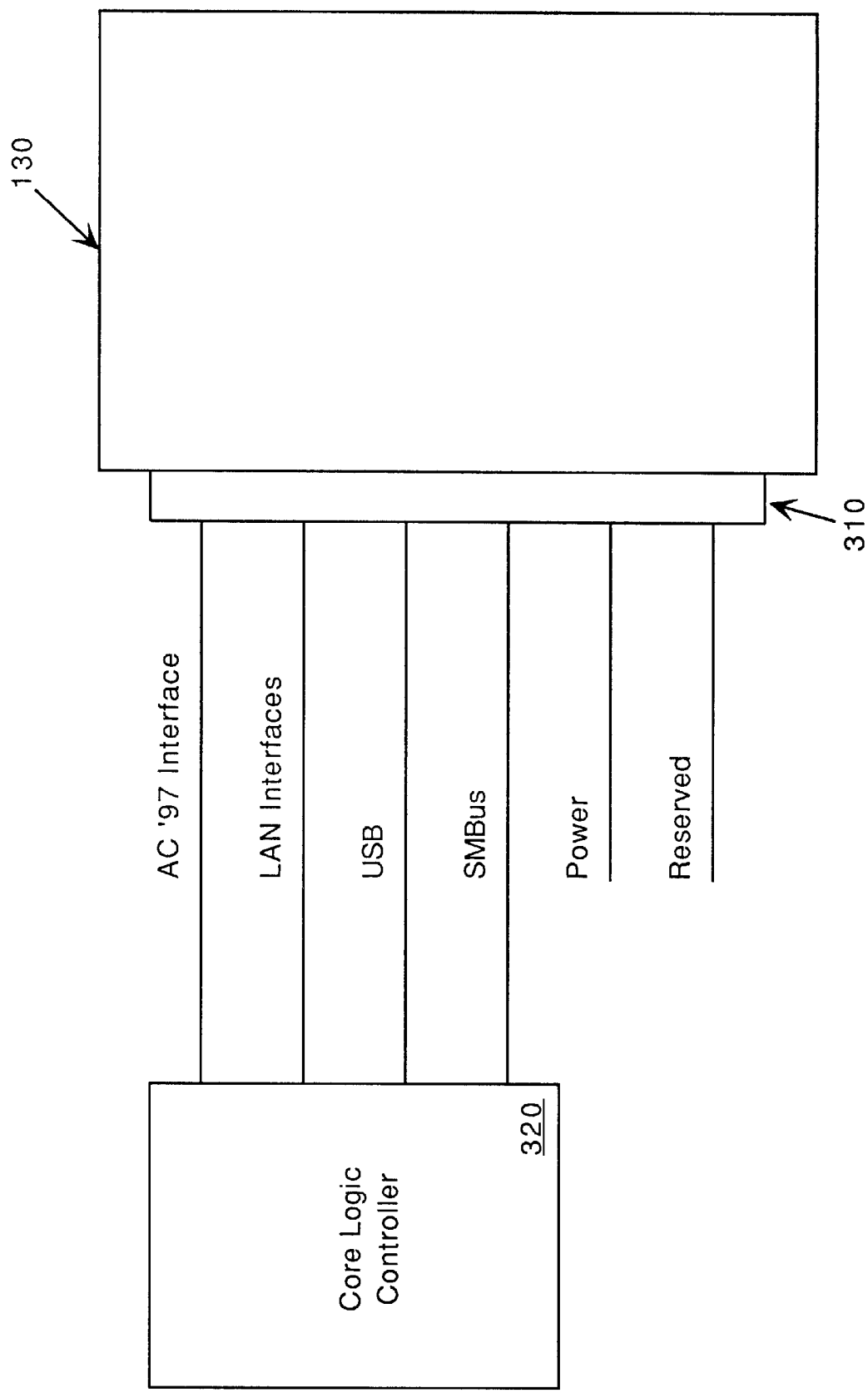
FIG. 3 illustrates a block diagram of one embodiment of a CNR interface.

FIG. 3 illustrates a block diagram of one embodiment of a Communication and Networking Riser (CNR) interface. The block diagram of FIG. 3 illustrates several specific interfaces; however, any number of type of interfaces can be supported. Thus, the description with respect to FIG. 3 is for explanation purposes and should not be read as limiting as to the interfaces that can be provided between a riser card and a motherboard.

The specific interfaces illustrated in FIG. 2 are Audio Codec '97 (AC '97), one or more network interfaces (LAN interfaces), a Universal Serial Bus (USB) interface, a System Management Bus (SMBus) interface, power lines and a set of reserved lines. In alternate embodiments, other interfaces can be provided.

AC '97 is described in Audio Codec '97 Component Specification, Revision 2.1 published May 22, 1998 by Intel Corporation. In one embodiment, two AC '97 codecs are supported; however, any number of AC '97 -compliant codecs can be supported. LAN interfaces generally refers to a set of signals to communicate via a network according to an appropriate protocol. USB is described in Universal Serial Bus Specification, Revision 1.1, published the USB Implementer's Forum (USB-IF) of Portland, Oreg. The System Management Bus Version 1.1 interface specification is available from Intel Corporation of Santa Clara, Calif.

Figure 4:
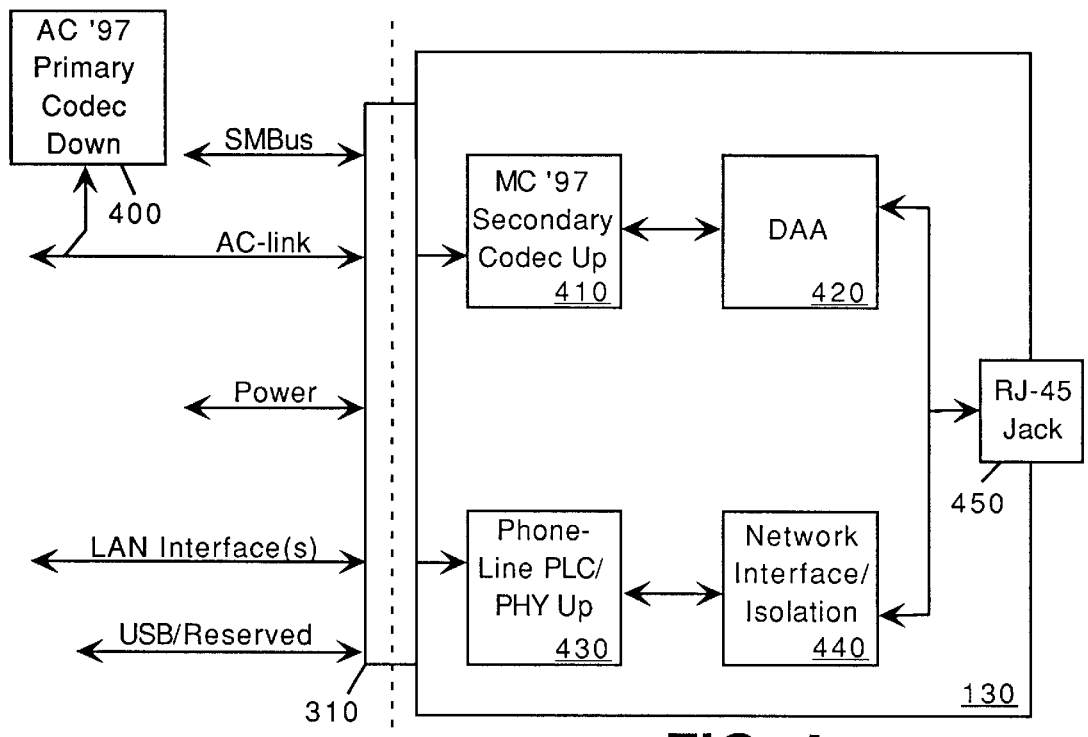
FIG. 4 illustrates one embodiment of a CNR providing an analog modem with a phone line network interface, in an electronic system containing an audio codec.

FIG. 4 illustrates one embodiment of a CNR providing an audio-down codec, a modem codec, and a phone line network interface. In one embodiment, the AC '97 primary codec down 400 is located on the motherboard and is coupled with CNR 130 via the AC '97 portion of interface 310. CNR 130 includes an MC '97 secondary codec up coupled with the AC '97 portion of interface 310. A Data Access Arrangement (DAA) 420 is coupled to codec 410. DAA 420 is an electronic interface between codec 410 and a public telephone line via RJ-11 jack 450. A DAA is also sometimes called a Telephone Line Interface Circuit (or Module). DAAs are typically required in any device that attaches to the public switched telephone network (PSTN), including fax machines, PBXs, set-top boxes, and alarm systems. Among other things, DAA 420 isolates the electronic device from the higher voltage on the telephone line.

Phone-line PLC/PHY up 430 and network interface/ isolation circuit 440 is also coupled between the LAN interface portion of 310 and RJ-11 jack 450 to provide a networking interface. Other components (e.g., USB components, EEPROM or other memory), which are not shown for reasons of simplicity of description, can also be included on CNR 130.

Figure 5:
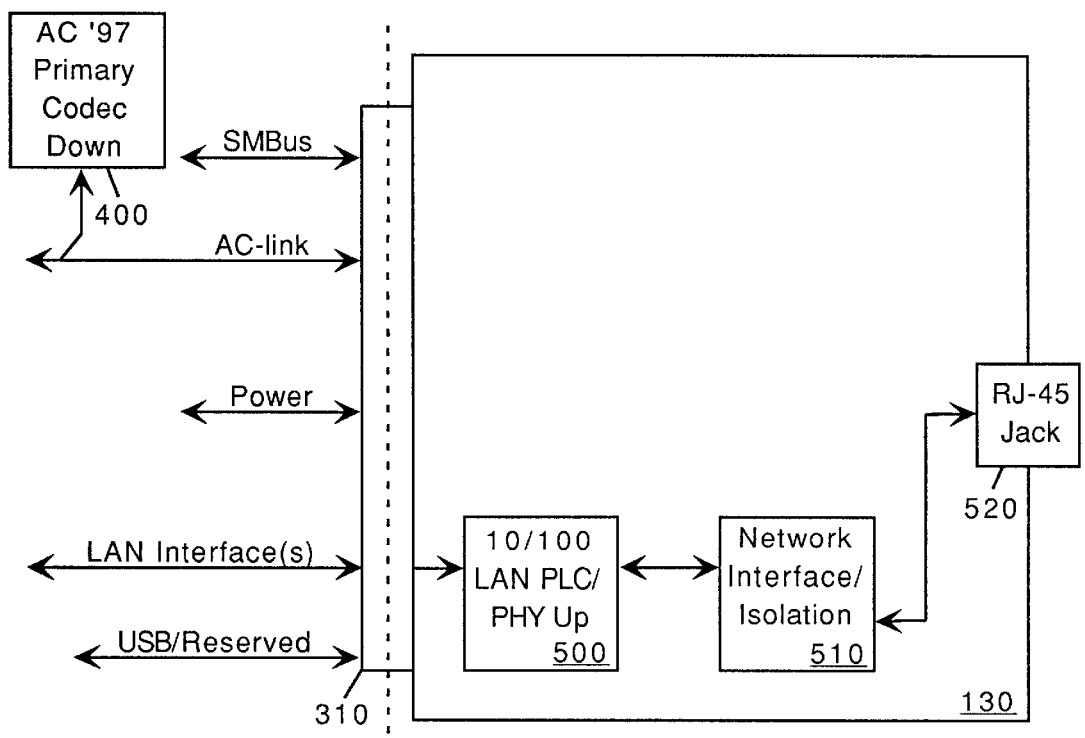
FIG. 5 illustrates one embodiment of a CNR providing a 10/100 LAN interface in an electronic system containing an audio codec.

FIG. 5 illustrates one embodiment of a CNR providing an audio-down codec with a 10/100 LAN interface. CNR 130, as illustrated in FIG. 5, supports Ethernet-based networking with 10/100 LAN PLC/PHY up 500, network interface/ isolation 510 and RJ-45 jack 520. In one embodiment, CNR 130 also includes the codecs and other components described above.

Figure 6:
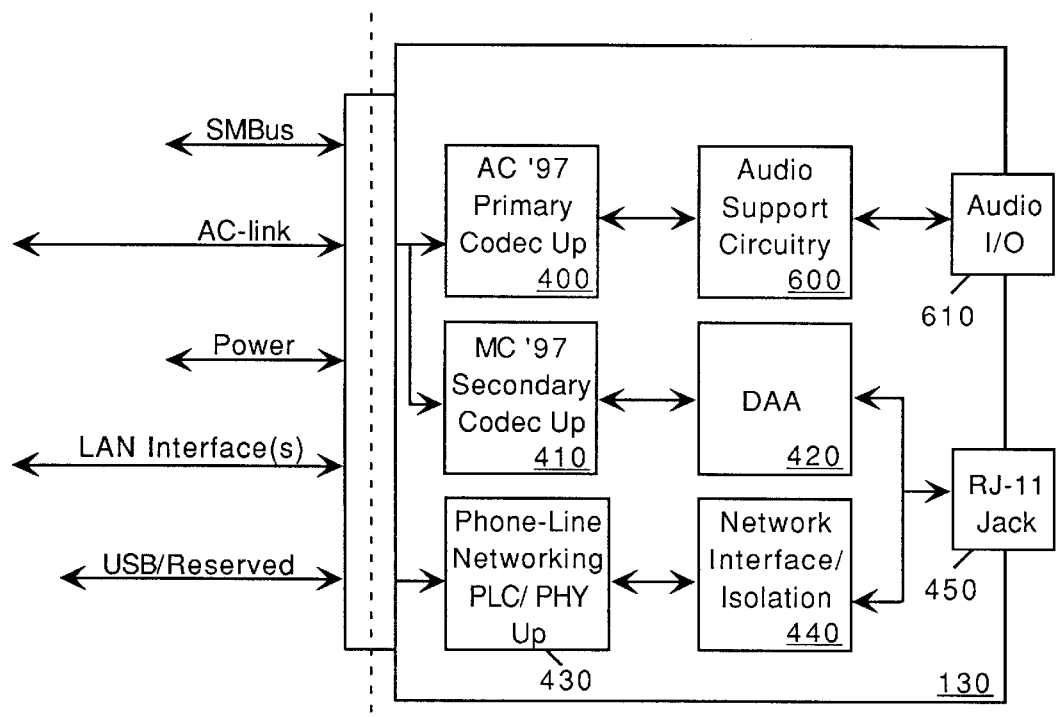
FIG. 6 illustrates one embodiment of a CNR providing audio and modem codecs and a phone line networking interface.

FIG. 6 illustrates one embodiment of a CNR providing audio and modem codecs and a phone line networking interface. CNR 130, as illustrated in FIG. 6, supports phone line networking as described above. CNR 130 also includes audio support circuitry 600 and audio I/O interface 610 to provide audio functionality. Other components can also be included on CNR 130.

Figure 7:
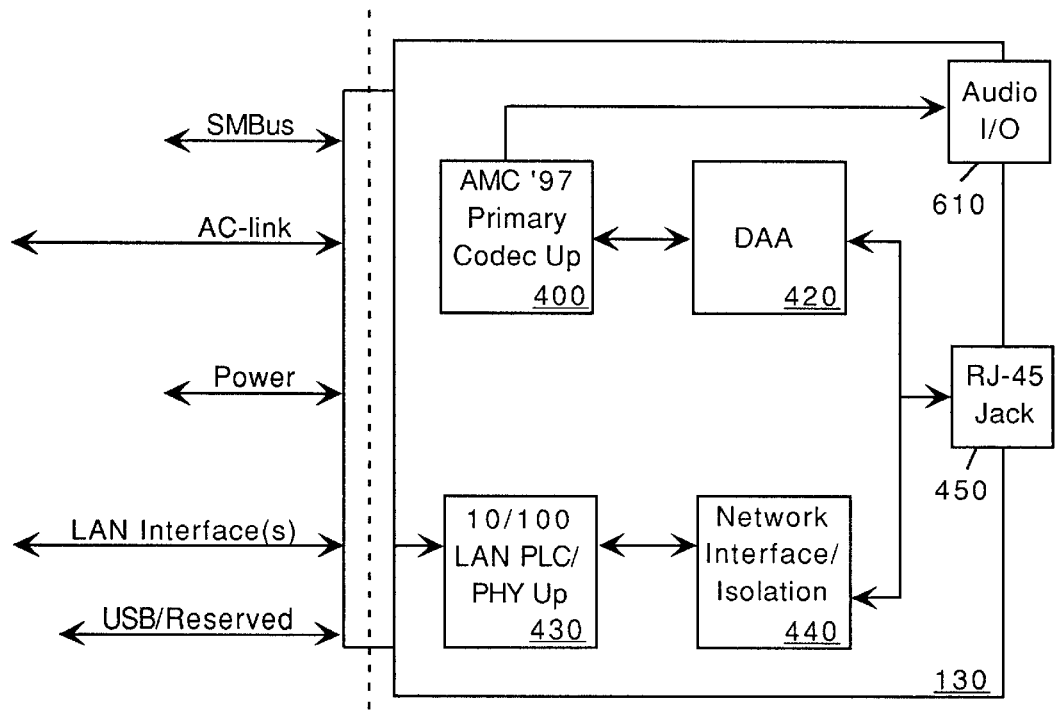
FIG. 7 illustrates one embodiment of a CNR providing an audio/modem codec and a phone line networking interface.

FIG. 7 illustrates one embodiment of a CNR providing an audio/modem codec and a phone line networking interface. FIG. 7 illustrates an alternative embodiment having audio/ modem support and phone line networking. Other components can also be included on CNR 130.

Figure 8:
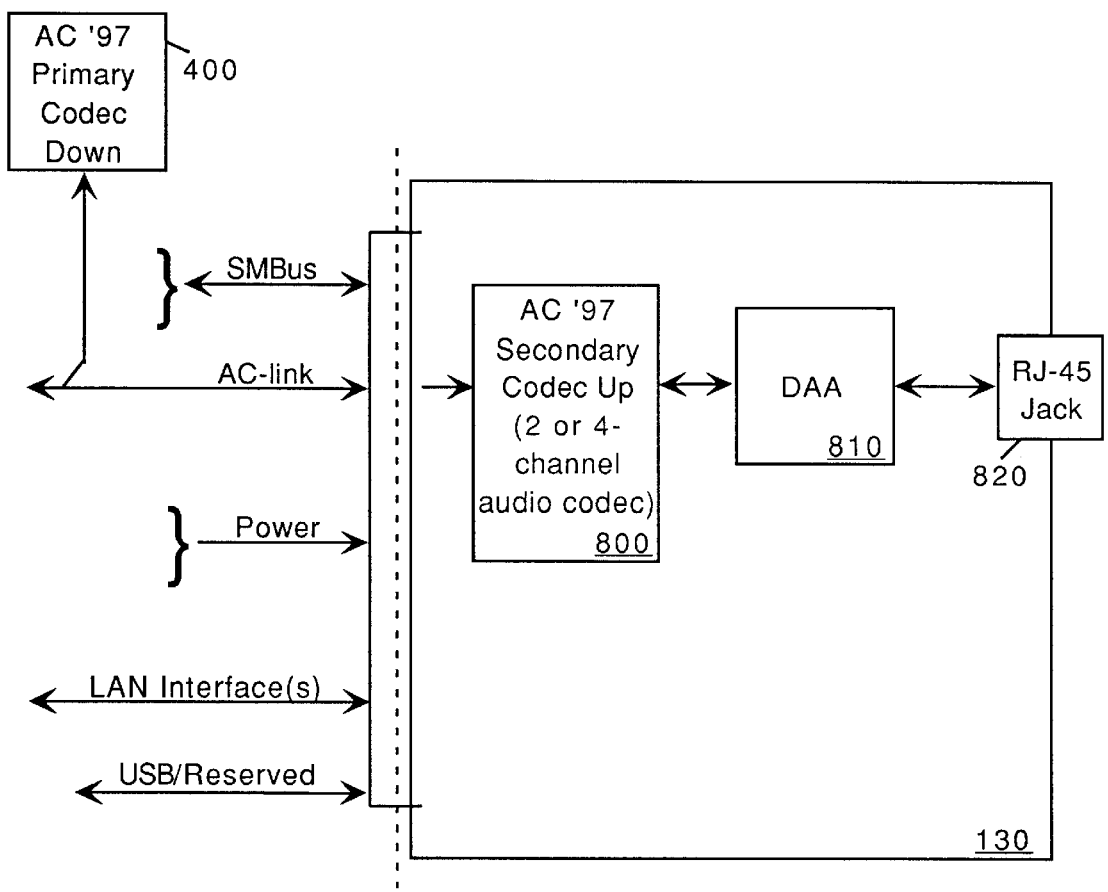
FIG. 8 illustrates one embodiment of a CNR providing a multi-channel audio upgrade to an electronic system containing an audio codec.

FIG. 8 illustrates one embodiment of a CNR providing a multi-channel audio upgrade. FIG. 8 illustrates CNR 130 with AC '97 secondary codec up 800, audio amplifier 810 and audio output jacks 820 to support multi-channel audio. Other components can also be included on CNR 130.

FIGS. 4–8 illustrate situations in which use of a CNR can reduce manufacturing costs. The desired communication and networking solution can be provided by inserting the CNR with the desired functionality without redesign of the motherboard.

In one embodiment, a system implementing an architecture with CNR 130 functionally treats CNR 130 as an extension of motherboard 200. This implies that the BIOS identifies the functionality provided by CNR 130 and implements appropriate support to provide properly configured interfaces. Operating systems have improved in the ability to use standardized registers to uniquely identify hardware added to a system and to provide the appropriate drivers for the hardware. In one embodiment, CNR 130 provides a Plug-and-Play (PnP) type interface.

In one embodiment, the PnP interface includes registers for Vendor ID (VID), Device ID (DID), Subsystem Vendor ID (SVID) and Subsystem ID (SID). Interfaces using other registers and/or identifiers can also be used. Because the front end (either digital or analog) functionality can be provided by different suppliers, with each implementing the surrounding support circuitry in a different manner, the identifiers associated with the functionality of CNR 130 are provided by some component of CNR 130.

In one embodiment PnP information related to CNR 130 is provided to an operating system using a combination of a SMBus based EEPROM and specialized BIOS routines. The electrical interface to the EEPROM is provided on the CNR connector through the signals SMB_SCL, SMB_SDA, SMB_A2, SMB_A1 and SMB_A0, each of which are defined by the SMBus standard. In alternate embodiments, other signals and/or interfaces can be used to provide the PnP information.

In one embodiment, the EEPROM is byte addressable and is SMBus address configurable through external strapping for use on an SMBus that may contain one or more memory devices. Other types of memories can also be used to provide PnP information as described herein.

Figure 9:
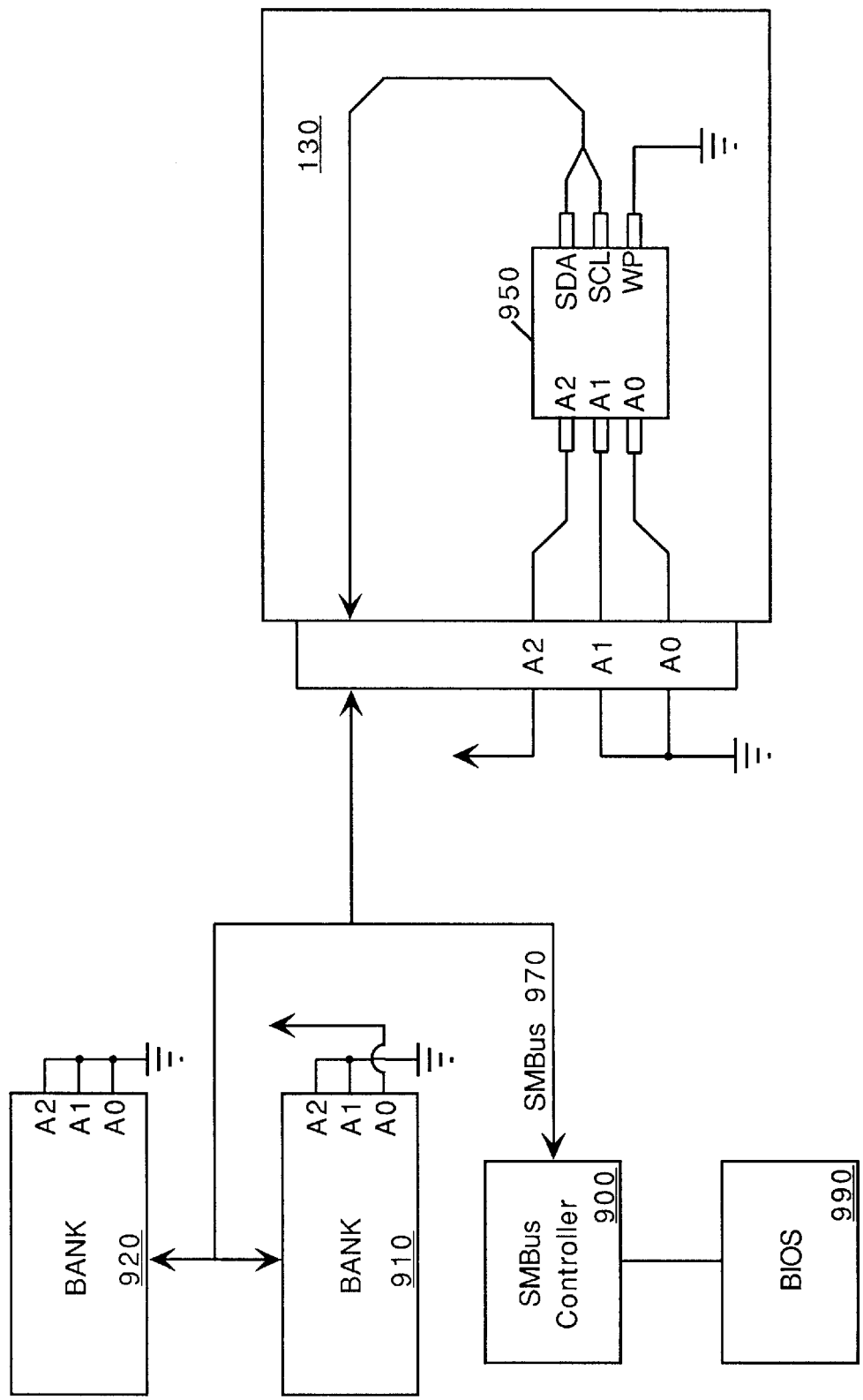
FIG. 9 is a conceptual illustration of a SMBus configuration for use with a riser card and multiple memory devices.

FIG. 9 is a conceptual illustration of one embodiment of a SMBus configuration for use with a riser card and multiple memory devices. FIG. 9 illustrates one embodiment in which memory banks 910 and 920 and EEPROM 950 have unique addresses, which are 001b, 000b and 100b, respectively. SMBus controller 900 communicates with, and controls, memory banks 910 and 920 and EEPROM 950 over SMBus 970. Use and configuration of SMBus 970 and SMBus controller 900 are known in the art.

In one embodiment, EEPROM 950 includes a master configuration space that is used by sequences of instructions stored in BIOS 990 that, when executed, determine the functionality supported by CNR 130. The master configuration space can also be used to determine where, within EEPROM 950, information related to each functionality is located along with the amount of memory each function uses. In one embodiment, instructions within BIOS 990 cause the associated electronic system to determine the functions supported by CNR 130, properly detect front end associated with each function, extract the information within EEPROM 950 associated with each function, and place the extracted data within the registers associated with each function to implement PnP functionality.

In one embodiment, the EEPROM master configuration space is provided in the following format; however, other formats as well as different and/or more or less information can also be provided in the master configuration space.

TABLE 1

Master Configuration Space Map

| Register Address | Register Name |
| --- | --- |
| 00h | EEPROM ID |
| 02h | EEPROM Size |
| 04h | CNR Compliance |
| 06h | AC '97 Compliance |
| 08h | Function ID |
| 0Ah to 0Ch | Reserved |
| 0Eh | Audio Pointer |
| 10h | Modem Pointer |
| 12h | USB Pointer |
| 14h | SMBus Pointer |
| 16h | Networking Pointer |
| 18h to 2Ch | Reserved Pointers |
| 2Eh | Last Valid Address |
| 30h | Checksum |

Conceptually, the master configuration space includes a set of 16-bit registers; however, other register sizes can also be used. Addresses are provided in hexadecimal (h) format.

In one embodiment, the EEPROM ID register contains a value that identifies EEPROM 950 as being present in the system. The EEPROM Size register contains a value that identifies the overall size of EEPROM 950. In one embodiment, BIOS 990 uses the EEPROM Size register value to determine how to access EEPROM 950 for random memory reads.

The CNR Compliance register provides a value that identifies the version of the CNR support provided. BIOS 990 can, for example, use the value to verify that the motherboard supports the features provided by CNR board 130. Similarly, the AC '97 Compliance register provides a value that identifies the version of the AC '97 specification the one or more codecs on CNR 130 support.

The Function ID register identifies the functionality provided by CNR 130. In one embodiment, individual bits within the Function ID register correspond to various functions; however, other configurations can also be used. The Reserved registers are reserved for future use. In alternate embodiments, the number of Reserved registers may be fewer, larger, or not included.

The Audio Pointer register stores a pointer to an EEPROM 950 location containing audio function data from the audio functionality supported by CNR 130. In one embodiment, instructions stored in BIOS 990, when executed, cause an electronic system to read PnP information from EEPROM 950 and to store the PnP information in the configuration registers corresponding to the audio function. The Audio Pointer register can also indicate that audio functionality is not supported by CNR 130. In one embodiment, the Modem Pointer register, the USB Pointer register, the SMBus Pointer register, and the Networking pointer register provide modem functionality, USB functionality, SMBus functionality, and networking functionality respectively, in a similar manner.

The Reserved Pointer registers are reserved to support future functionality. In alternate embodiments, more, fewer, or no pointer registers are reserved. The Last Valid Address register indicates the end of valid data in EEPROM 950. The Checksum registers include error detection/correction information. In alternate embodiments, checksum information is provided in alternate forms or may not be provided.

In one embodiment, a portion of EEPROM 950 stores information related to the audio functionality provided by CNR 130. As mentioned above, the Audio Pointer register stores a pointer to this information. In one embodiment, the audio functionality information stored in EEPROM 950 overrides any conflicting audio information provided by other components, for example, the motherboard. In one embodiment the audio functionality information includes an Audio CNR Vendor ID, an Audio CNR Model ID, a Multi-Channel Signature, and a Multi-Channel Model ID.

The Audio CNR Vendor ID contains a value that is placed in the SVID register for the PCI audio configuration space. In one embodiment, the Audio CNR Vendor ID is the PCI Special Interest Group (SIG) assigned vendor ID for the company that provides CNR 130 and associated drivers. The Audio CNR Model ID contains a value that is placed into the SID register of the PCI audio configuration space. In one embodiment, the value is unique (to the manufacturer of CNR 130) model number.

The CNR Multi-Channel Signature register stores a value that is used by the BIOS routines to determine if CNR 130, for the purpose of multi-channel upgrades, is compliant with the motherboard to which CNR 130 is coupled. In one embodiment, BIOS 990 causes the contents of the CNR Multi-Channel Signature register to be compared with a value provided by the manufacturer of the codec on the motherboard to determine compatibility. The Audio Multi-Channel Model ID register contains a value that is placed in the SID register of the PCI audio configuration space when the CNR Multi-Channel Signature register matches the value from the motherboard.

In one embodiment, a portion of EEPROM 950 stores information related to the modem functionality provided by CNR 130. As mentioned above, the Modem Pointer register stores a pointer to this information. In one embodiment, the modem functionality information stored in EEPROM 950 overrides any conflicting modem information provided by other components, for example, the motherboard. In one embodiment the modem functionality information includes a Modem CNR Vendor ID and a Modem CNR Mode ID.

The Modem CNR Vendor ID contains a value that is placed in the SVID register for the PCI modem configuration space. In one embodiment, the Modem CNR Vendor ID is the PCI SIG assigned vendor ID for the company that provides CNR 130 and associated drivers. The Modem CNR Model ID contains a value that is placed into the SID register of the PCI modem configuration space. In one embodiment, the value is unique (to the manufacturer of CNR 130) model number.

In one embodiment, EEPROM 950 stores information related to USB functionality. This information is indicated by the USB Pointer register and identifies the USB feature set support to BIOS 990. In one embodiment the USB functionality information indicates whether the associated device is a USB hub device, whether the associated device is capable of supporting a wake-up event, and what version of USB is required to support the functionality of CNR 130.

In one embodiment, EEPROM 950 stores information related to SMBus functionality. This information is indicated by the SMBus Pointer register and can be used to identify SMBus standard versions supported and/or specific features supported by CNR 130.

In one embodiment, EEPROM 950 stores information related to networking features supported by CNR 130. This information is indicated by the Networking register. In one embodiment, the networking information includes a LAN Option register, a LAN CNR Vendor ID, and a LAN CNR Model ID. In one embodiment, individual bits of the LAN Option register indicate the configuration of networking support. For example, a bit can indicate whether CNR 130 includes a 17-pin MII interface or an alternate LAN interface.

The LAN CNR Vendor ID contains a value that is placed in the SVID register for the PCI network configuration space. In one embodiment, the LAN CNR Vendor ID is the PCI SIG assigned vendor ID for the company that provides CNR 130 and associated drivers. The LAN CNR Model ID contains a value that is placed into the SID register of the PCI network configuration space. In one embodiment, the value is unique (to the manufacturer of CNR 130) model number.

Figure 10A:
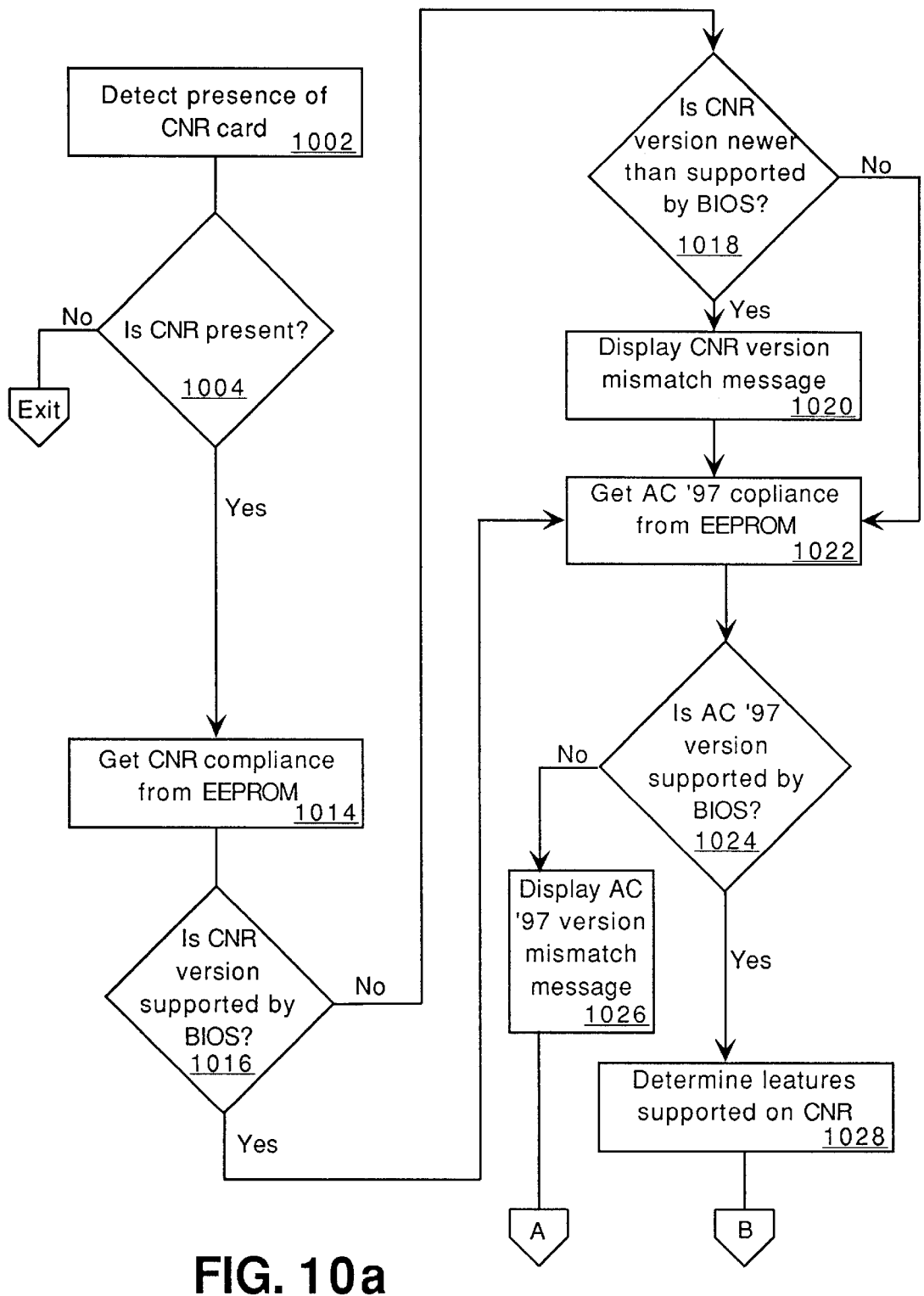
FIGS. 10a–10b are one embodiment of a flow diagram for riser card plug and play support.
Figure 10B:
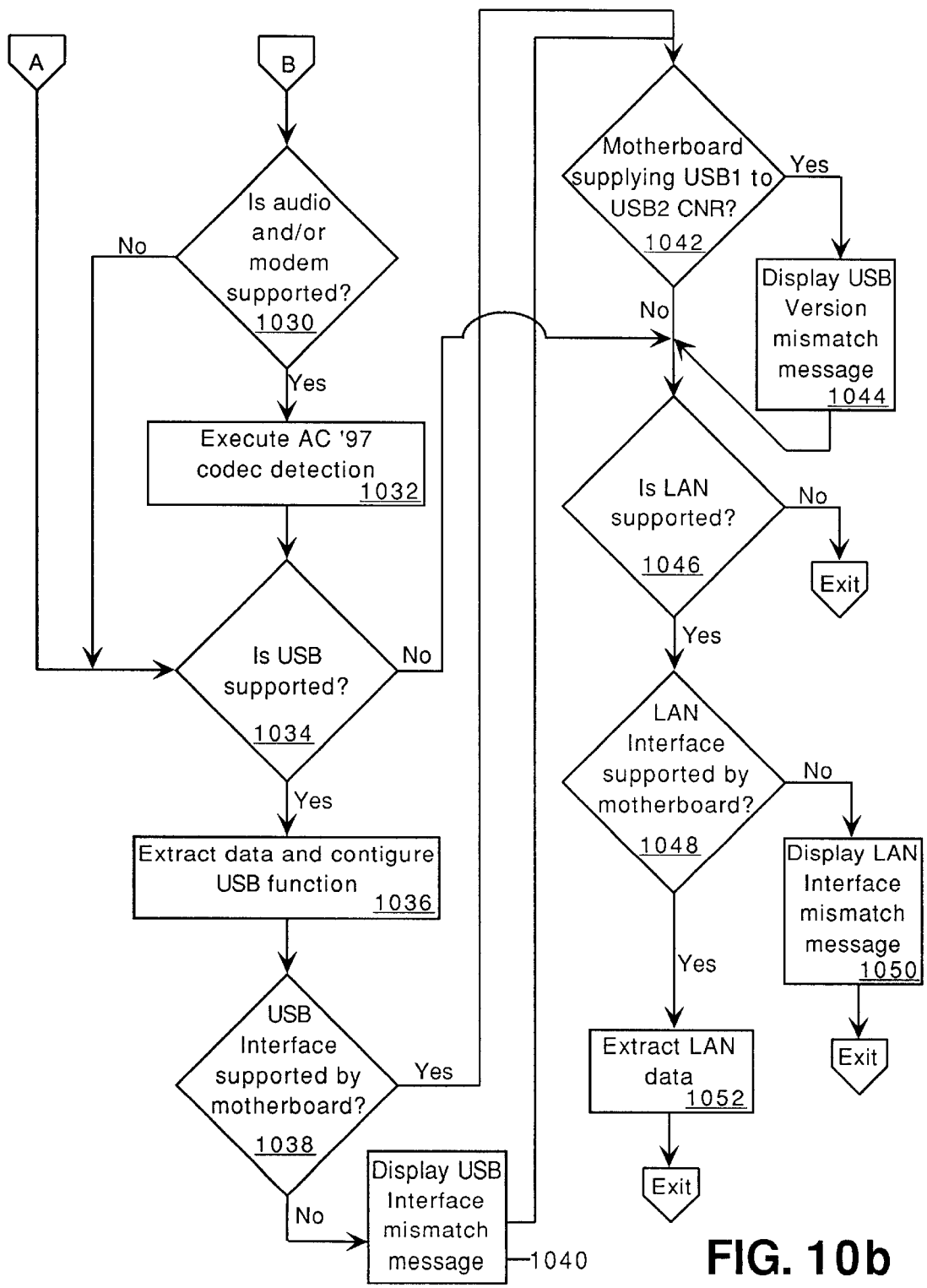
Figure 11A:
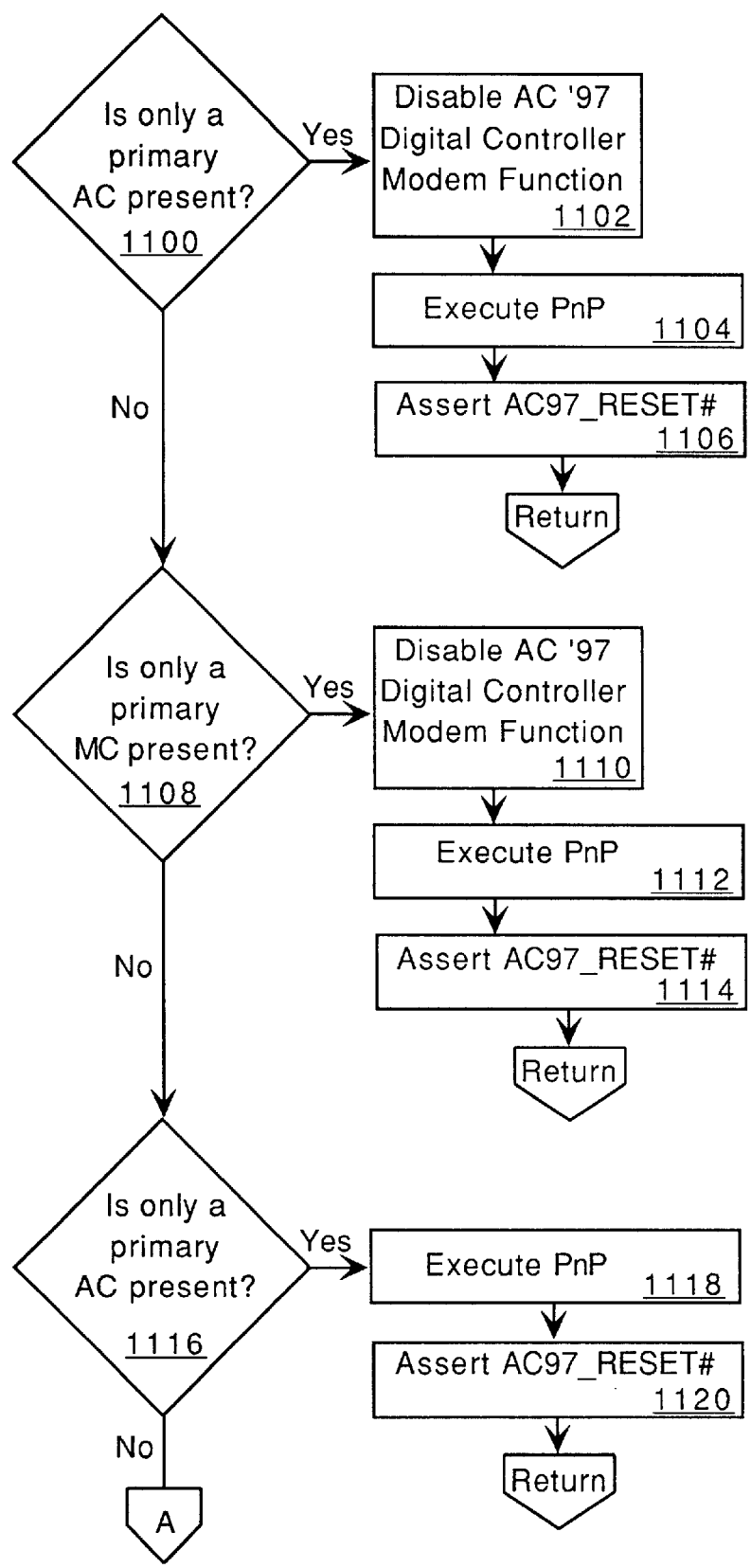
FIGS. 11a–11d are a flow diagram for one embodiment of enabling AC '97 functionality.
Figure 11B:
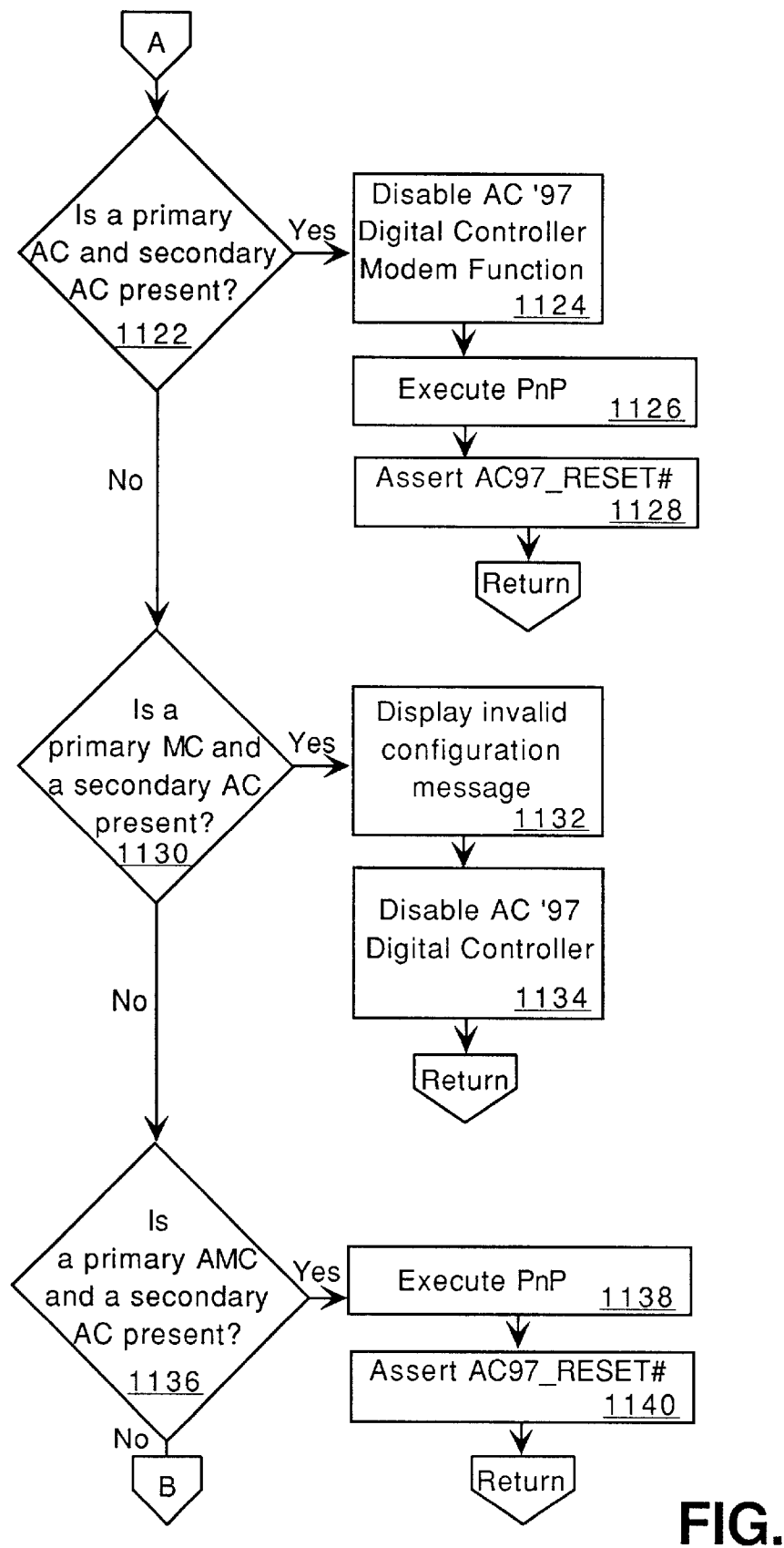
Figure 11C:
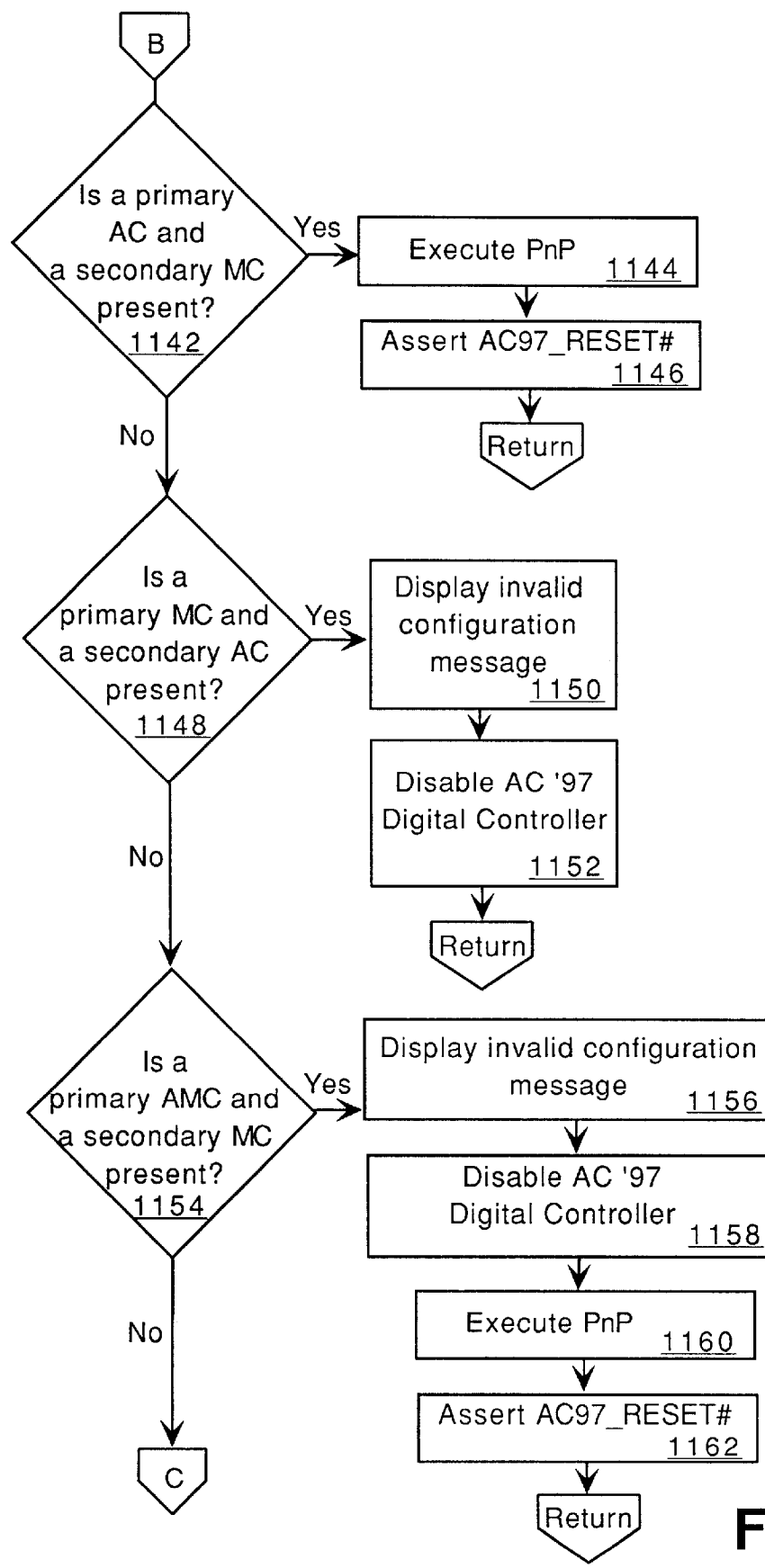
Figure 11D:
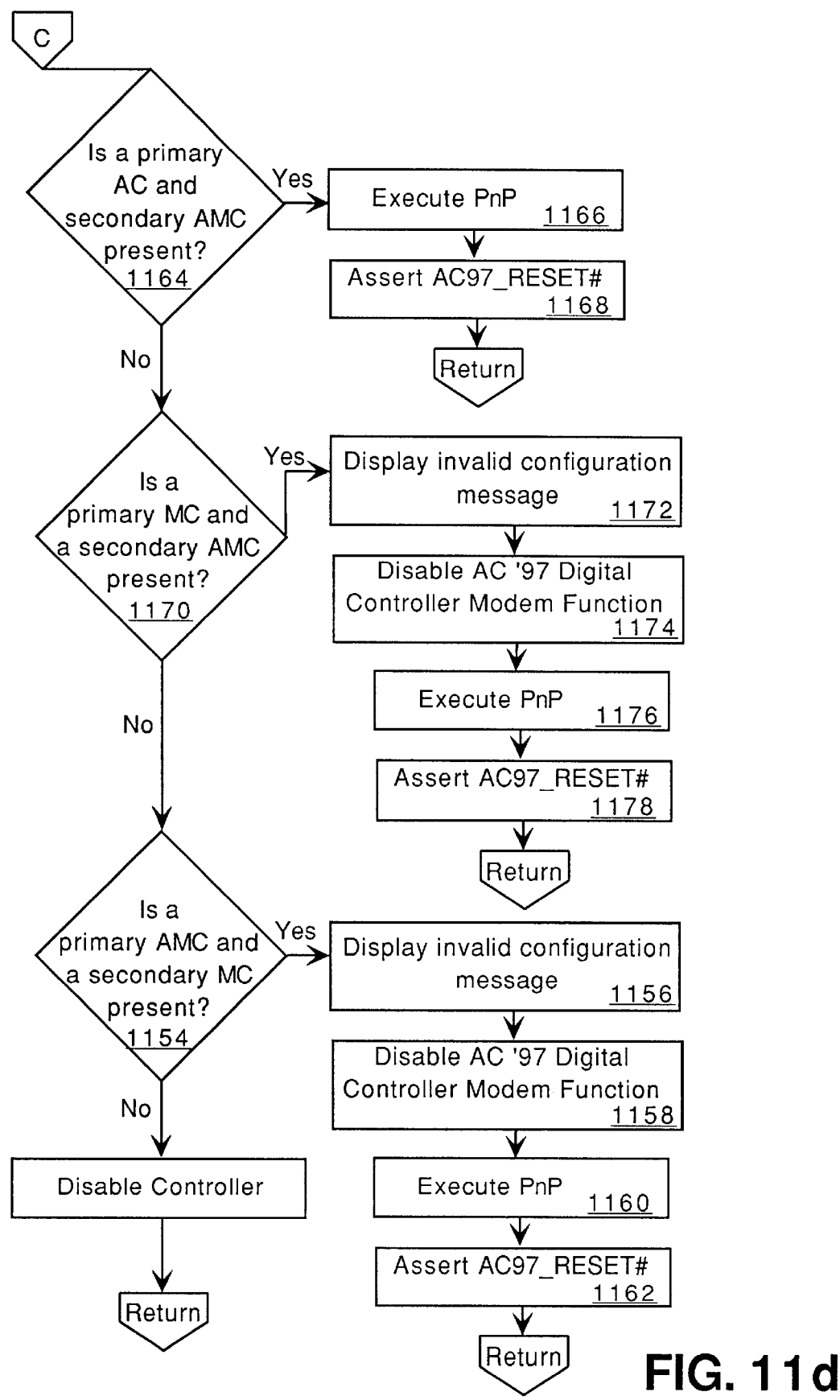

FIGS. 10*a*–10*b* are one embodiment of a flow diagram for riser card plug and play support. The flow diagram of FIGS. 10*a*–10*b* corresponds to detecting support for AC '97, USB and networking support; however, other functionality can be supported in a similar manner.

In one embodiment, support of a CNR with PnP functionality by a motherboard requires specific BIOS support. In one embodiment, the BIOS causes an electronic system to identify CNR board presence, download information from a memory device (e.g., EEPROM, RAM, registers) on the CNR, and configure and enable/disable the appropriate interfaces.

The presence of a CNR card is detected at 1002. In one embodiment, a BIOS or other start up sequence includes sequences of instructions that determine whether a CNR is connected to a predetermined interface. Other techniques for detecting the presence of a CNR card can also be used. If a CNR is not present at 1004, the process ends.

In one embodiment, the size of an EEPROM included on the CNR card is determined after the CNR card is detected. The size of the EEPROM and/or the size of the stored PnP information can be determined so that the BIOS operates on valid data. In one embodiment, a checksum or other technique is used to verify the contents of the EEPROM.

If a CNR is present at 1004, the CNR compliance information is retrieved at 1014.

In one embodiment, sequences of instructions within the BIOS cause the electronic system to retrieve the CNR compliance information from a memory (e.g., EEPROM, ROM, RAM) on the CNR. In alternate embodiments, the CNR compliance information is hardwired into an interface or retrieved in another manner.

The electronic system determines whether the CNR version is supported by the BIOS at 1016. If not, the electronic system determines if the CNR version is newer than what is supported by the BIOS at 1018. If the CNR version is not supported by the BIOS because the CNR version is newer than what is supported by the BIOS, a CNR version mismatch message is generated at 1020.

If the CNR version is supported by the BIOS, AC '97 information is retrieved from the EEPROM (or other memory device) on the CNR, at 1022. One embodiment of AC '97 information is described above; however, other types of information can also be provided. The electronic system determines whether the AC '97 version provided by the CNR is supported by the BIOS at 1024.

If the AC '97 version is not supported by the BIOS, an AC '97 mismatch message is generated at 1026 the remaining process related to AC '97 is skipped. If the AC '97 version is supported, sequences of instructions in the BIOS cause the electronic system to determine the features supported by the CNR at 1028. In one embodiment, the features supported are determined by register information provided by the EEPROM as described above.

The BIOS causes the electronic system to determine whether audio and/or modem functionality is supported at 1030. If so, the BIOS executes an AC '97 codec detection at 1032. If audio and/or modem functionality is not supported the codec detection of 1032 is skipped.

At 1034, the BIOS causes the electronic system to determine whether USB functionality is supported at 1034. If USB functionality is not supported, the USB feature and support information retrieval is skipped. If USB functionality is supported, USB data is extracted from the EEPROM and the USB functions are configured at 1036.

The BIOS causes the electronic system to determine if USB is supported by the motherboard at 1038. If not, a USB interface mismatch message is generated at 1040. If USB is supported by the motherboard, the electronic system determines whether the versions of USB supported by the motherboard and the CNR match at 1042. If not, a USB version mismatch message is generated at 1044.

At 1046, the BIOS causes the electronic system to determine whether networking is supported. If not, the process is complete. If networking is supported, the electronic device determines whether the networking interface of the CNR is supported by the motherboard. If not, a networking interface mismatch message is generated. If the networking interface of the CNR is supported by the motherboard, networking information is extracted at 1052.

FIGS. 11*a*–11*d* are a flow diagram for one embodiment of enabling AC '97 functionality. FIGS. 11*a*–11*d* are related to multiple codecs and AC '97; however, AC '97 functionality can be enabled in a different manner, or other functionality can be enabled in a similar manner. In one embodiment, the process of FIGS. 11*a*–11*d* is performed by an electronic system during a start up sequence in response to instructions that are part of a BIOS; however, the process can be performed in response to instructions that are not part of a BIOS or not during a start up sequence.

In one embodiment, the process of FIGS. 11*a*–11*d* is performed after the AC '97 information is retrieved from the EEPROM on the CNR and codec detection on the motherboard. The information indicates whether a primary and/or secondary audio codec (AC) is present, a primary and/or secondary modem coded (MC) is present, a primary and/or secondary audio/modem codec (AMC).

If only a primary AC is present at 1100, modem controller functions are disabled 1102, the appropriate PnP routines are executed at 1104, and the AC97_RESET# signal is asserted at 1106. The AC97_RESET# signal allows the PC_BEEP signal to ass during power on self test. The PC_BEEP signal is known to those in the art.

If only a primary MC is present at 1108, audio controller functions are disabled at 110, the appropriate PnP routines are executed at 1112, and the AC97_RESET# signal is asserted at 1114. If only a primary AMC is present at 1116, the appropriate PnP routines are executed at 1118, and the AC97_RESET# signal is asserted at 1120.

If a primary and a secondary AC are present at 1122, modem controller functions are disabled at 1124, the appropriate PnP routines are executed at 1126, and the AC97_RESET# signal is asserted at 1128. If a primary MC and a secondary AC are present at 1130, an invalid configuration message is generated at 1132 and the AC '97 controller is disabled at 1134.

If a primary AMC and a secondary AC are present at 1136, PnP routines are executed at 1138 and the AC97—RESET# signal is asserted at 1140. If a primary AC and a secondary MC are present at 1142, PnP routines are executed at 1144 and the AC97_RESET# signal is asserted at 1146.

If both a primary and a secondary MC are present at 1148, an invalid configuration message is generated at 1150 and the AC '97 controller is disabled at 1152. If a primary AMC and a secondary MC are present at 1154, an invalid configuration message is generated at 1156, AC '97 modem functions are disabled at 1158, PnP routines are executed at 1160 and the AC97_RESET# signal is asserted at 1162.

If a primary AC and a secondary AMC are present at 1164, PnP routines are executed at 1166 and the AC97_RESET# signal is asserted at 1168. If a primary MC and a secondary AMC are present at 1170, an invalid configuration message is generated at 1172, modem functions are disabled at 1174, PnP routines are executed at 1176 and the AC97_RESET# signal is asserted at 1178.

If primary and secondary AMCs are present at 1180, an invalid configuration message is generated at 1182, modem functions are disabled at 1184, PnP routines are executed at 1186 and the AC97_RESET# signal is asserted at 1188. If no codecs are present the AC '97 controller is disabled at 1190.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    determining functionality provided by a riser card connected to a motherboard, wherein the riser card operates as a logical extension of the motherboard and provides an external interface for the motherboard;
    storing an indication of the functionality provided by the riser card in a set of one or more predetermined registers determined by an operating system; and
    loading drivers corresponding to the functionality provided by the riser card and the motherboard.

2. The method of claim 1 wherein the functionality comprises one or more audio codecs.

3. The method of claim 1 wherein the functionality comprises one or more modem codecs.

4. The method of claim 1 wherein the functionality comprises support for one or more Universal Serial Bus devices.

5. The method of claim 1 wherein the functionality comprises support for one or more SMBus devices.

6. The method of claim 1 wherein the functionality comprises networking functionality.

7. The method of claim 1 wherein the driver is loaded by an operating system.

8. The method of claim 1 wherein determining functionality provided by a riser card comprises retrieving information from a memory coupled to the riser card.

9. The method of claim 1 further comprising selecting a subset of audio channels to be supported from a set of channels based, at least in part, on a signature value.

10. The method of claim 9 wherein the signature value provides an identifier associated with one or more codecs to support the subset of audio channels.

11. An article comprising a machine-readable medium having stored thereon sequences of instructions that, when executed, cause one or more electronic systems to:

determine functionality provided by a riser card connected to a motherboard, wherein the riser card operates as a logical extension of the motherboard and provides an external interface for the motherboard;

store an indication of the functionality provided by the riser card in a set of one or more predetermined registers determined by an operating system; and load drivers corresponding to the functionality provided by the riser card and the motherboard.

12. The machine-readable medium of claim 11 wherein the functionality comprises one or more audio codecs.

13. The machine-readable medium of claim 11 wherein the functionality comprises one or more modem codecs.

14. The machine-readable medium of claim 11 wherein the functionality comprises support for one or more Universal Serial Bus devices.

15. The machine-readable medium of claim 11 wherein the functionality comprises support for one or more SMBus devices.

16. The machine-readable medium of claim 11 wherein the functionality comprises networking functionality.

17. The machine-readable medium of claim 11 wherein the driver is loaded by an operating system.

18. The machine-readable medium of claim 11 wherein the sequences of instructions that cause the one or more electronic systems to determine functionality provided by a riser card comprises sequences of instructions that, when executed, cause the one or more electronic systems to retrieve information from a memory coupled to the riser card.

19. The machine-readable medium of claim 11 further comprising selecting a subset of audio channels to be supported from a set of channels based, at least in part, on a signature value.

20. The method machine-readable medium of claim 11 wherein the signature value provides an identifier associated with one or more codecs to support the subset of audio channels.

21. A computer data signal embodied in a data communications medium shared among a plurality of network devices comprising sequences of instructions that, when executed, cause one or more electronic systems to:

determine functionality provided by a riser card connected to a motherboard, wherein the riser card operates as a logical extension of the motherboard ad provides an external interface for the motherboard;

store an indication of the functionality provided by the riser card in a set of one or more predetermined registers determined by an operating system; and load drivers corresponding to the functionality provided by the riser card and the motherboard.

22. The computer data signal of claim 21 wherein the functionality comprises one or more audio codecs.

23. The computer data signal of claim 21 wherein the functionality comprises one or more modem codecs.

24. The computer data signal of claim 21 wherein the functionality comprises support for one or more Universal Serial Bus devices.

25. The computer data signal of claim 21 wherein the functionality comprises support for one or more SMBus devices.

26. The computer data signal of claim 21 wherein the functionality comprises networking functionality.

27. The computer data signal of claim 21 wherein the driver is loaded by an operating system.

28. The computer data signal of claim 21 wherein the sequences of instructions that cause the one or more electronic systems to determine functionality provided by the riser card comprises sequences of instructions that, when executed, cause the one or more electronic systems to retrieve information from a memory coupled to the riser card.

29. The computer data signal of claim 21 further comprising sequences of instructions that, when executed, cause the one or more electronic systems to select a subset of audio channels to be supported from a set of channels based, at least in part, on a signature value.

30. The computer data signal of claim 29 wherein the signature value provides an identifier associated with one or more codecs to support the subset of audio channels.

* * * * *

UNITED STATES PATENT AND TRADEMARK OFFICE
CERTIFICATE OF CORRECTION

PATENT NO.    : 6,647,451 B1
DATED         : November 11, 2003
INVENTOR(S)   : Barmore It is certified that error appears in the above-identified patent and that said Letters Patent is hereby corrected as shown below:

Column 7,
Line 58, delete "Mode" and insert -- Model --.

Column 10,
Line 2, delete "ass" and insert -- pass --.
Line 5, delete "110" and insert -- 1110 --.
Line 18, delete "AC97-RESET#" and insert -- AC97_RESET# --.

Signed and Sealed this

Sixth Day of April, 2004

JON W. DUDAS
*Acting Director of the United States Patent and Trademark Office*